(12) United States Patent
Bouchard et al.

(10) Patent No.: US 7,454,015 B1
(45) Date of Patent: Nov. 18, 2008

(54) CONFERENCE CALL RECORDER

(76) Inventors: Conrad J. Bouchard, 224 Sandalwood Ct., Vacaville, CA (US) 95687; Emily F. Bouchard, 224 Sandalwood Ct., Vacaville, CA (US) 95687; Stephen D. Allmer, 1449 Shelby Dr., Fairfield, CA (US) 94534

( * ) Notice: Subject to any disclaimer, the term of this patent is extended or adjusted under 35 U.S.C. 154(b) by 734 days.

(21) Appl. No.: 11/023,124

(22) Filed: Dec. 28, 2004

(51) Int. Cl.
*H04M 1/00* (2006.01)
(52) U.S. Cl. ............... 379/447; 379/205.01; 379/68
(58) Field of Classification Search ............ 379/205.01, 379/447, 68
See application file for complete search history.

(56) References Cited

U.S. PATENT DOCUMENTS

| | | | |
|---|---|---|---|
| 4,862,509 A | 8/1989 | Townsend | |
| 5,444,768 A * | 8/1995 | Lemaire et al. | 379/68 |
| 5,544,231 A | 8/1996 | Cho | |
| 5,568,538 A * | 10/1996 | Tamir et al. | 455/412.1 |
| 5,668,868 A * | 9/1997 | Nordenstrom | 379/447 |
| 6,671,567 B1 * | 12/2003 | Dwyer et al. | 700/94 |
| 7,123,936 B1 * | 10/2006 | Rydbeck et al. | 455/557 |

* cited by examiner

*Primary Examiner*—Olisa Anwah

(57) ABSTRACT

A conference call recorder that utilizes a cassette or digital recording medium. The recorder is capable of initializing a call at a pre-programmed time, connecting, entering a PIN, and recording the call. This capability is not limited to one call placement and records up to 2 hours on cassette and 5-10 hours on CD. The calls are stored on cassette or digital medium for later listening or for removing and listening in other players. The recorder is also capable of playing various messages to incoming preprogrammed numbers and groups of numbers.

12 Claims, 5 Drawing Sheets

CONFERENCE CALL RECORDER

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

1. Field of the Invention

The invention relates to telephones and telephone accessories and more specifically to a conference call recorder that is either a part of or works in conjunction with a telephone.

2. Description of the Prior Art

Answering machines and telephone recorders are not new in the art; however, none demonstrate the advantages of the present invention. By way of example:

U.S. Pat. No. 4,862,509 issued to Townsend on Aug. 29, 1989 discloses a portable recorder.

U.S. Pat. No. 5,544,231 issued to Cho on Aug. 6, 1996 discloses a method of recording a telephone conversation.

While the above-described devices fulfill their respective and particular objects and requirements, they do not describe a conference call recorder that provides for the advantages of the present invention, therefore, a need exists for an improved conference call recorder, particularly one that includes a compact disc or cassette recorder for recording lengthy conference calls, even when a listener is not present to initiate and operate the recorder. In this respect, the present invention substantially departs from the conventional concepts and designs of the prior art.

SUMMARY OF THE INVENTION

In view of the foregoing disadvantages inherent in the known types of telephone recorders now present in the prior art, the conference call recorder overcomes the above-mentioned disadvantages and drawbacks of the prior art. As such, the general purpose of the conference call recorder, described subsequently in greater detail, is to provide a conference call recorder which has all of the advantages of the prior art mentioned heretofore and many novel features that result in an improved conference call recorder which is not anticipated, rendered obvious, suggested, or even implied by the prior art, either alone or in combination thereof.

To accomplish this, the conference call recorder comprises programmable features which allow a user to preprogram times for which conference calls or other calls are to be made. With conference calling, for example, if a user cannot be present to initiate a call, the conference call recorder is programmed with time, date, and phone number. In addition, the invention can be preset to make more than one attempt and to make more than one call connection. Further, the timeframe needed to receive audio feedback from a call connection can be set, such that a delay in audio signal from the number reached need not affect disconnect function. After initiating and completing a call, the invention records the audio signals, either via cassette or digital storage device such as a compact disc (CD) or even hard drive. Digital storage is not limited but includes various devices known in the art. The preprogrammed timeframe needed for audio feedback and disconnect determines when the invention halts the recording. The number and time programmed by the user causes the invention to retain the recording in that particular unique file. This file can also be determined by unique number designated by a user.

Calls are thereby initiated and preserved for future listening and for transport of recordings. As example, a user might replay an important conference call while traveling in an auto, utilizing the auto's CD or cassette player. A user might replay a recorded call or conference among a group of others, for shared information. The conference call recorder enables such advantages without requiring a user to be present at a phone during any particular event.

Recording capabilities are also used in person, if so desired. The conference call recorder is offered in several embodiments. Those include both cassette and digital storage device, whether hard drive or compact disc, employment with the invention separate from a typical telephone.

The embodiments also offer inclusion of a telephone within the same case as the conference call recorder. While technology known in the arts of communication and recording are not unique, the incorporation of those technologies in providing the advantages of the conference call recorder are. Especially important is that the preferred embodiments of the conference call recorder feature up to 2 hours of recording time with cassette employment and 5-10 hours of recording time with the employment of current CD technology. A user need no longer miss important calls nor be relegated to recording only a short call. The mobility of the recorded medium also provides great leeway in listening environment, with a user being able to take the recorded messages virtually anywhere to share with anyone desired.

Controls of the various embodiments of the conference call recorder are exemplary of those known in the arts of communication and recording and playback. Controls are not limited to only those portrayed. Other controls known in the arts are utilized in further embodiments.

Additional features of the programmability of the conference call recorder provide that a user is also able to record virtually any message for an incoming call. The microprocessor recognizes an incoming call and can even be programmed to play different messages to pre-recorded numbers called from. A user therefore is able to uniquely tailor a particular answer message to a particular caller or even groups of callers.

Thus has been broadly outlined the more important features of the conference call recorder so that the detailed description thereof that follows may be better understood and in order that the present contribution to the art may be better appreciated.

Numerous objects, features and advantages of the conference call recorder will be readily apparent to those of ordinary skill in the art upon reading the following detailed description of presently preferred, but nonetheless illustrative, embodiments of the conference call recorder when taken in conjunction with the accompanying drawings. In this respect, before explaining the current embodiments of the conference call recorder in detail, it is to be understood that the invention is not limited in its application to the details of construction and arrangements of the components set forth in the following description or illustration. The invention is capable of other embodiments and of being practiced and carried out in various ways. It is also to be understood that the phraseology and terminology employed herein are for purposes of description and should not be regarded as limiting.

Those skilled in the art will appreciate that the conception upon which this disclosure is based may readily be utilized as a basis for the design of other structures, methods and systems for carrying out the several purposes of the conference call recorder. It is therefore important that the claims be regarded as including such equivalent constructions insofar as they do not depart from the spirit and scope of the present invention.

A primary object, then, of the conference call recorder is to provide a programmable conference call recorder that is capable of initiating and completing a connection and recording a call without a user being present.

An additional object of the conference call recorder is to provide for recording lengthy audio signal.

A further object of the conference call recorder is to provide for conference call recording as either a telephone with recording and playback capabilities or as an apparatus that works in conjunction with an existing telephone.

And, it is an object of the conference call recorder to provide a portable medium of recorded calls.

These together with additional objects of the conference call recorder, along with various novel features that characterize the invention are particularly pointed out in the claims forming a part of this disclosure. For better understanding of the conference call recorder, its operating advantages and specific objects attained by its uses, refer to the accompanying drawings and description.

DETAILED DESCRIPTION OF THE PREFERRED EMBODIMENT

With reference now to the drawings, and in particular FIGS. 1-5 thereof, the preferred embodiment of the conference call recorder employing the principles and concepts of the present invention and generally designated by the reference number 10 will be described.

Figure 1:
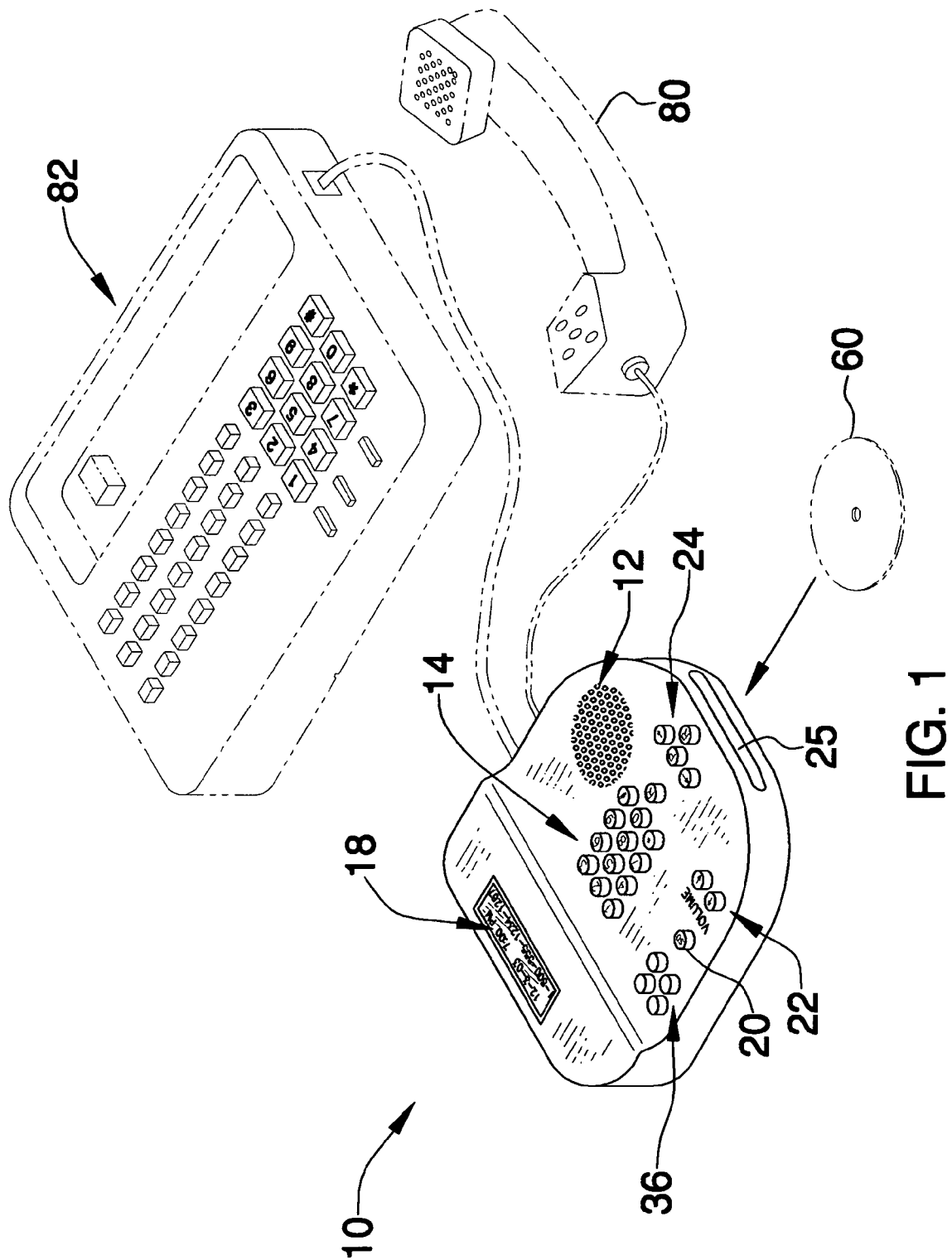
FIG. 1 is a perspective view of an embodiment of the conference call recorder employing compact disc (CD) technology and plugged into an existing typical telephone.

Referring to FIG. 1, the companion embodiment of invention 10 is connected to a phone 82. Phone 82 is typical in the art and requires no unusual features in order to communicate properly with invention 10. This embodiment of invention 10 is a companion to a phone 82 in that this embodiment does not include a handset 80 or the phone 82. Existing phone 82 is utilized such that this embodiment of invention 10 works in conjunction with phone 82. Invention 10 comprises a typical keypad 14. Invention 10 further comprises a typical Compact Disc (CD) receiving slot 25 disposed within the front of the invention 10, the slot for accepting a typical CD. Control buttons 24 disposed below keypad 14 are also typical in the art of CD controls and include buttons for forward, reverse, play, and eject. While buttons 24 are exemplary, they are not limited to only these functions but may employ other features and controls known in the field of art. Display 18 is featured on the rearward top of invention 10 and offers displays also typical in the field, features such as display of time and date, number dialed, numbers in memory, program function display, and the like. To the left of keypad 14 are volume control buttons 22. Additionally and proximally to buttons 22 is speed dial button 20 which functions as a speed dialer 20 when a party to be reached is recalled from numbers in memory. The typical speaker 12 is disposed on the opposite side of keypad 14.

Figure 2:
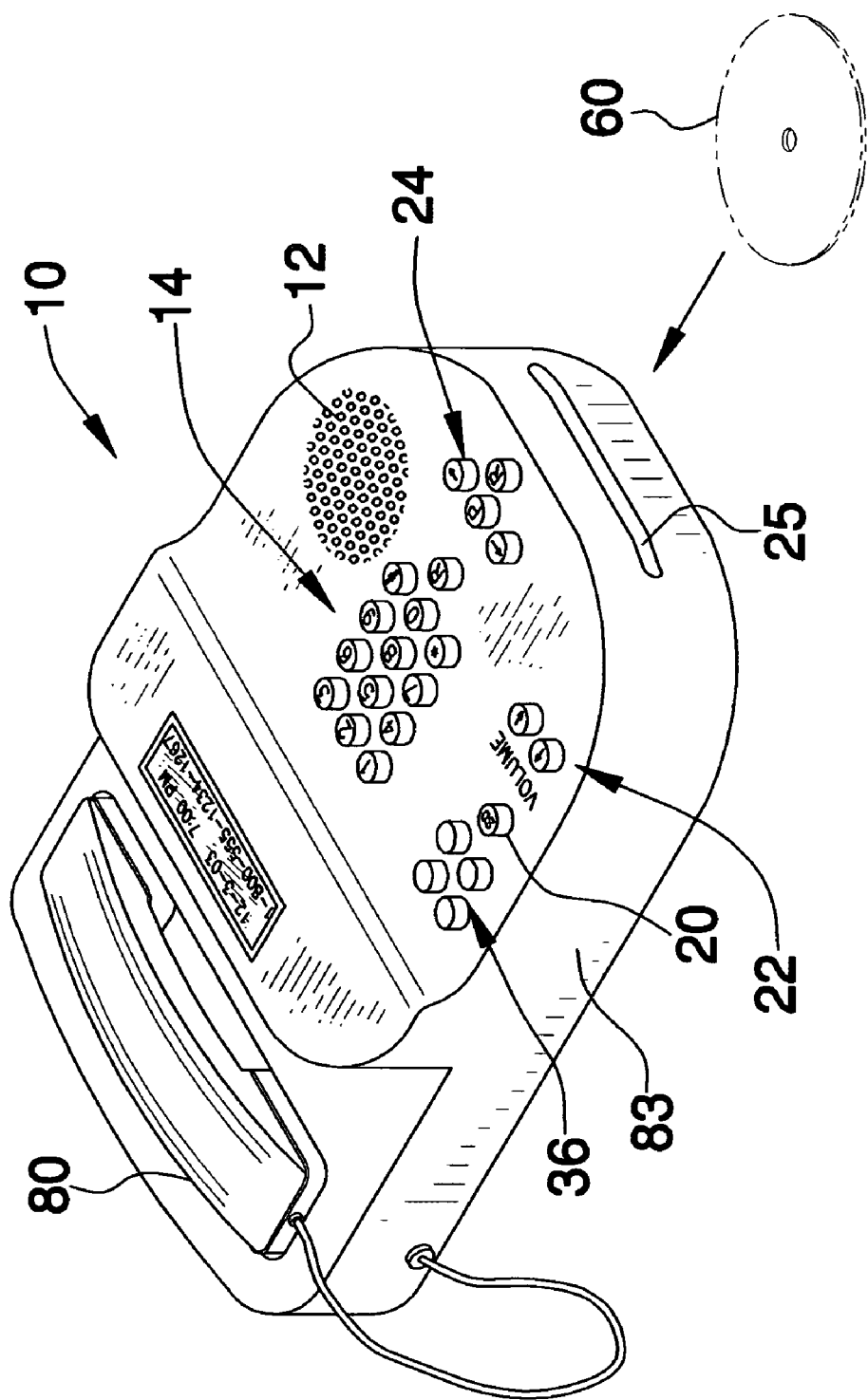
FIG. 2 is a perspective view of the embodiment of the combined conference call recorder and telephone, the recorder utilizing a CD.

Referring to FIG. 2, the complete embodiment of invention 10 is illustrated with handset 80 and phone 82 incorporated into a complete unit. Controls and functions identical to those of FIG. 1 remain. Phone 82 is of typical construction and internal components and is known throughout the art. CD phone case 83 is unique to invention 10 in order to incorporate both invention 10 and phone 82.

Figure 3:
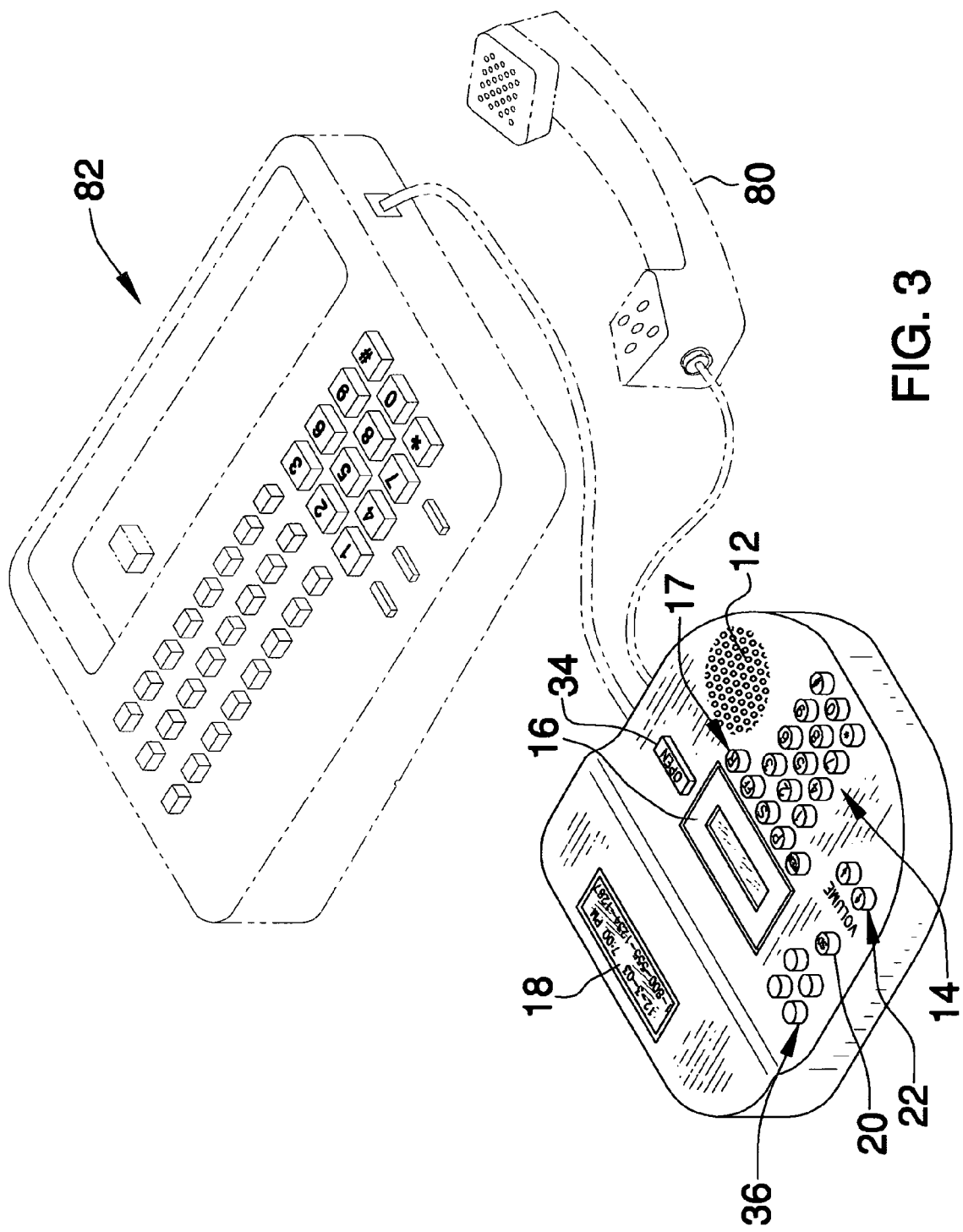
FIG. 3 is a perspective view of the conference call recorder embodiment that utilizes a cassette, the recorder utilizing an existing telephone.

Referring to FIG. 3 the embodiment of invention 10 utilizing a standard cassette is further comprised of controls and functions typical in the art of cassette recorders and includes the same keypad 14, volume controls 22, speed dial 20, open button 34 for opening the cassette compartment 16 and accessing a cassette (not shown) for loading and unloading. Display 18 is included in like fashion to that of the previously described embodiments of invention 10. Typical cassette controls 17 include fast forward, play, stop, pause, and rewind.

Figure 4:
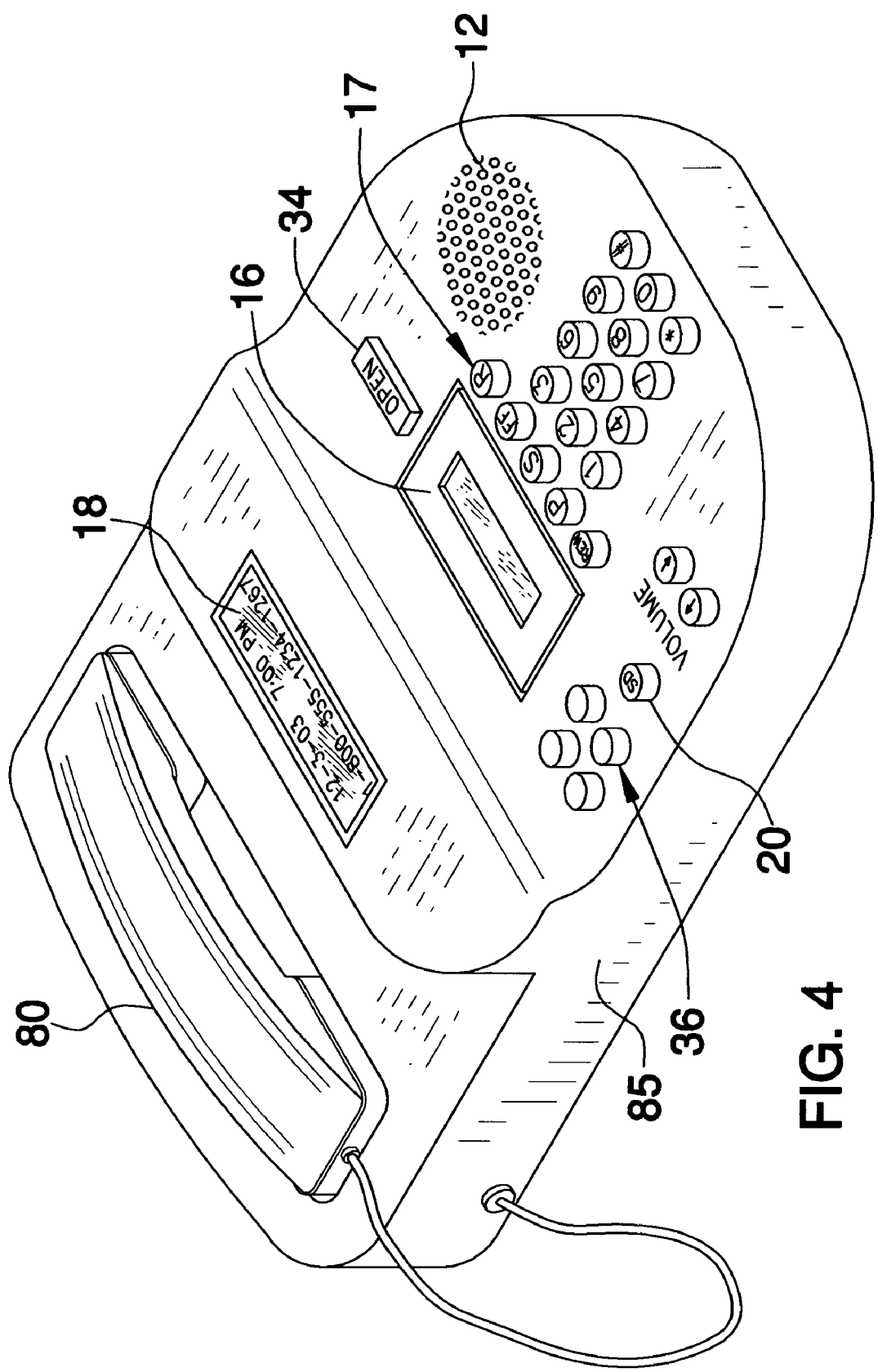
FIG. 4 is a perspective view of the embodiment of the combined conference call recorder and telephone, the recorder utilizing a cassette.

Referring to FIG. 4, the further embodiment of invention 10 incorporating a phone 82 is similar to the CD and telephone embodiment of invention 10 with the difference only of cassette rather than CD function and controls. Cassette phone case 85 incorporates both phone 82 and handset 80 design and also encasement of invention 10.

Figure 5:
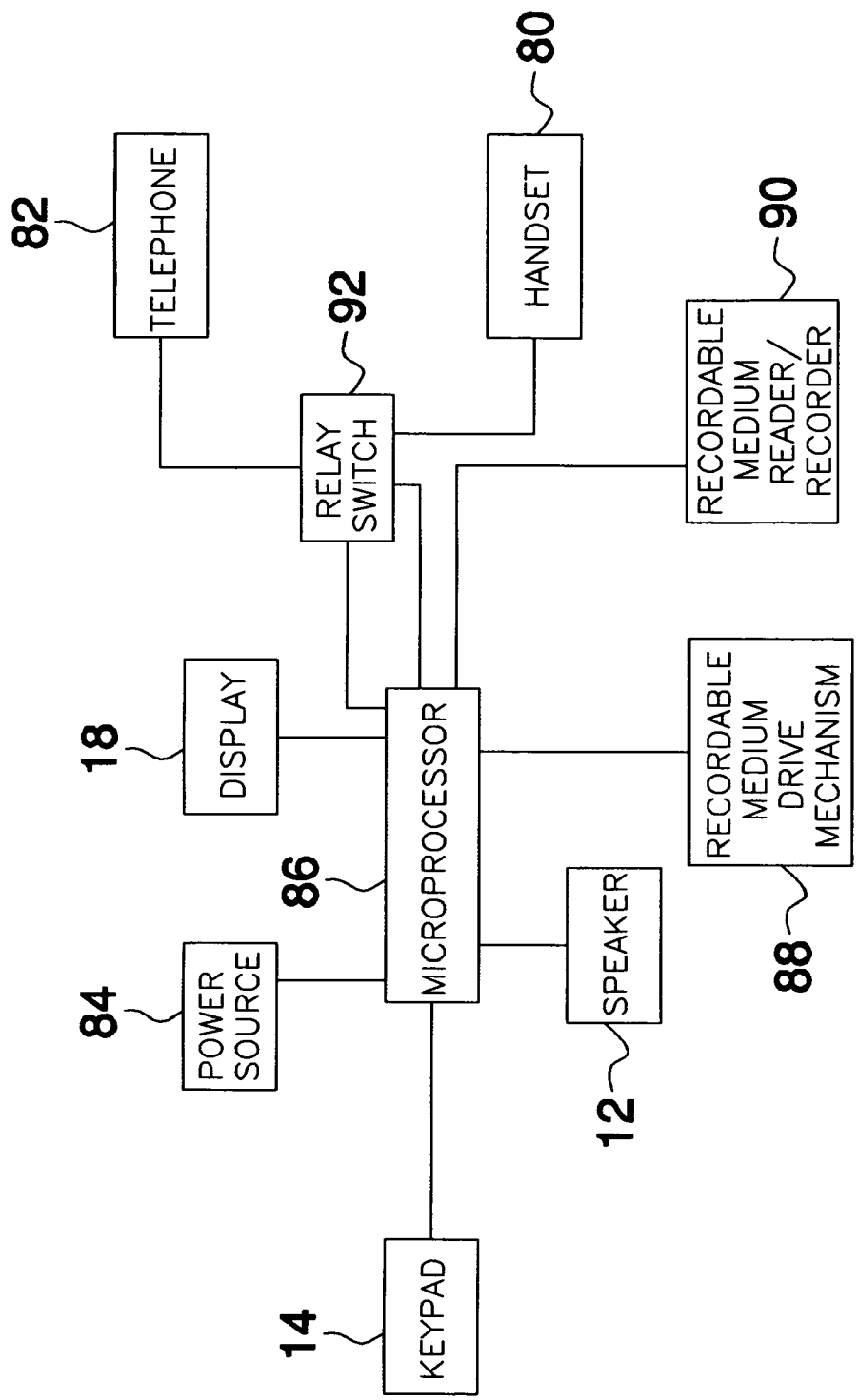
FIG. 5 is a diagram of the circuitry of the conference call recorder and accompanying telephone and handset.

Referring to FIG. 5, a schematic of the components of invention 10 illustrates functional schematic of invention 10. The schematic remains identical in all embodiments whether incorporating invention 10 within or without a phone case 83 or 85. A relay connects phone 82 functions to microprocessor 86 of invention 10. Microprocessor 86 communicates with the various functional components and commands of invention 10. Also communicating and interacting with microprocessor 86 is recordable medium drive mechanism 88 and recordable medium reader/recorder 90. Both mechanism 88 and reader/recorder 90 are known throughout the art of CD and cassette recording and playback devices, especially with respect to music. Typical power source 84 is battery or AC voltage as is typically used to power telephones. Such devices are designed to record lengthy audio and thereby provide for invention 10 to do likewise. Invention 10 is therefore not limited to short time frame audio recording, as are typical telephone recorders and playback devices.

In use, user (not shown) is provided with a variety of functional commands. User first ensures that a cassette is inserted into compartment 16. If the CD embodiment is utilized, a recordable CD 60 is inserted into CD receiving slot 25. In order to command the invention 10 to make and record a conference call, as example of unique function of invention 10, user utilizes programming controls 36 to communicate with microprocessor 86. To make a future conference call connection while not present, the user chooses the number to be dialed.

User then chooses date and time of call, as many conference calls occur at preset times. User then enters the PIN needed to join a conference call. User then selects how many times invention 10 is to try to complete the call, in case the first call is met with busy signal or other inconvenience. Each programming function is displayed on display 18. Invention 10 is therefore programmed to perform without a user having to be present. Upon the preset time being met, invention 10 opens the telephone connection and listens for a dial tone, exactly as if a user had picked up the handset 80. A sample sequence of events then occurs as follows:

| | |
|---|---|
| dial tone? | yes |
| dial number | 1.970.555.1515 |
| connection? | no |
| disconnect, wait 5 seconds, redial | 1.970.555.1515 |
| connect? | yes |
| pause 5 seconds (time is editable) | send PIN |
| create unique file and record conference | |
| listen for 10 seconds of no sound (time frame editable) | disconnect |

The conference call is now preserved on either the CD or the cassette contained within invention 10. Upon return, a user selectively removes the CD or cassette for potential transport for listening elsewhere, such as during travel or even at a personal conference or meeting. Conversely, a user selects play button, in person, for play of calls at and from invention 10.

Additionally, if a use is present at the time of a conference call, or any call wishing to be recorded, user utilizes record features of the various embodiments of invention 10 to record in person.

With respect to the above description then, it is to be realized that the optimum dimensional relationships for the parts of the conference call recorder, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A programmable conference call recorder apparatus for use with an existing telephone, the apparatus comprising a substantially parallelepiped housing with rounded corners, the housing containing programmable microprocessor linked controls and functions of the apparatus, the controls and functions disposed on an exterior of the housing, the controls and functions comprising visually and tactilely accessible:
    programming controls;
    viewing screen displaying numerical and alphabetical symbols;
    keypad comprising numbers 1-9 and 0 and pound key and star key;
    speed dial control;
    record control;
    speaker;
    volume control for the speaker;
    removable recording medium;
    the housing further internally comprising:
        recordable drive mechanism removably receiving the recording medium;
        reverse control for the recordable drive mechanism;
        forward control for the recordable drive mechanism;
        means for removably connecting the apparatus to an existing telephone;
        lowering means;
    wherein the programming controls provide programming for time of day in placing a call.

2. The programmable conference call recorder apparatus in claim 1 wherein the programming controls provide programming for entering a Personal Identification Number.

3. The programmable conference call recorder apparatus in claim 2 wherein messages are played to incoming calls.

4. The programmable conference call recorder apparatus in claim 3 wherein incoming calls are programmably recognizable and messages for those calls differentiated.

5. The programmable conference call recorder apparatus in claim 4 wherein the removable recording medium is a cassette.

6. The programmable conference call recorder apparatus in claim 4 wherein the removable recording medium is digital.

7. The programmable conference call recorder apparatus in claim 5 wherein the conference call recorder apparatus further comprises a computer hard drive.

8. The programmable conference call recorder apparatus in claim 6 wherein the conference call recorder apparatus further comprises a computer hard drive.

9. A programmable conference call recorder apparatus for use with an existing telephone, the apparatus comprising a substantially parallelepiped housing with rounded corners, the housing containing programmable microprocessor linked controls and functions of the apparatus, the controls and functions disposed on an exterior of the housing, the controls and functions comprising visually and tactilely accessible:
    programming controls, the programming controls providing programming for time of day in placing a call, the programming controls further providing programming for entering a Personal Identification Number:
    viewing screen displaying numerical and alphabetical symbols;
    keypad comprising numbers 1-9 and 0 and pound key and star key;
    speed dial control;
    record control;
    speaker;
    volume control for the speaker;
    removable recording medium;
    the housing further internally comprising:
        recordable drive mechanism removably receiving a cassette recording medium;
        reverse control for the recordable drive mechanism;
        forward control for the recordable drive mechanism;
        means for removably connecting the apparatus to an existing telephone;
        powering means.

10. The programmable conference call recorder apparatus in claim 9 wherein the conference call recorder apparatus further comprises a computer hard drive.

11. A programmable conference call recorder apparatus for use with an existing telephone, the apparatus comprising a substantially parallelepiped housing with rounded corners, the housing containing programmable microprocessor linked controls and functions of the apparatus, the controls and functions located on an exterior of the housing, the controls and functions comprising visually and tactilely accessible:

programming controls, the programming controls providing programming for time of day in placing a call, the programming controls further providing programming for entering a Personal Identification Number:

viewing screen displaying numerical and alphabetical symbols;

keypad comprising numbers 1-9 and 0 and pound key and star key;

speed dial control;

record control;

speaker;

volume control for the speaker;

removable recording medium;

the housing further internally comprising:

recordable drive mechanism removably receiving a digital recording medium;

reverse control for the recordable drive mechanism;

forward control for the recordable drive mechanism;

means for removably connecting the apparatus to an existing telephone; powering means.

12. The programmable conference call recorder apparatus in claim 11 wherein the conference call recorder apparatus further comprises a computer hard drive.

\* \* \* \* \*